United States Patent [19]

Kojima et al.

[11] 4,311,188

[45] Jan. 19, 1982

[54] CONTROL METHOD AND APPARATUS FOR AIR CONDITIONERS

[75] Inventors: Yasuhumi Kojima, Gifu; Teiichi Nabeta, Okazaki; Fumio Otuka, Kariya, all of Japan

[73] Assignee: Nippondenso Co., Ltd., Kariya, Japan

[21] Appl. No.: 145,877

[22] Filed: May 1, 1980

[30] Foreign Application Priority Data

May 9, 1979 [JP] Japan .................................. 54-57215

[51] Int. Cl.³ ............................................. F25B 13/00
[52] U.S. Cl. ........................................ 165/2; 165/43; 236/91 D; 62/179
[58] Field of Search ................. 165/43, 2, 28; 62/179, 62/186; 236/91 D, 91 F

[56] References Cited

U.S. PATENT DOCUMENTS 4,147,205 4/1979 Bata et al. .......................... 165/43 X
4,248,051 2/1981 Darcy et al. ...................... 236/91 D

FOREIGN PATENT DOCUMENTS

2813081 1/1979 Fed. Rep. of Germany ... 236/91 D

Primary Examiner—William E. Wayner
Attorney, Agent, or Firm—Cushman, Darby & Cushman

[57] ABSTRACT

In an electric control method and apparatus for an air conditioner, a digital computer is utilized to calculate the quantity of heat necessary for adjusting and maintaining the actual temperature in a compartment to a desired value. The computer is also programmed to calculate the quantity of air flow in accordance with the actual ambient temperature outside the compartment and to calculate the temperature of air flow in relation to the calculated quantity of air flow necessary for discharging the calculated quantity of heat into the compartment.

12 Claims, 8 Drawing Figures

CONTROL METHOD AND APPARATUS FOR AIR CONDITIONERS

BACKGROUND OF THE INVENTION

The present invention relates to a control method and apparatus for an air conditioner, and more particularly to a control method and apparatus suitable for an automobile air conditioner wherein the quantity and temperature of air flow are controlled in accordance with various changes of ambient temperature outside the passenger compartment of an automobile.

Figure 1:
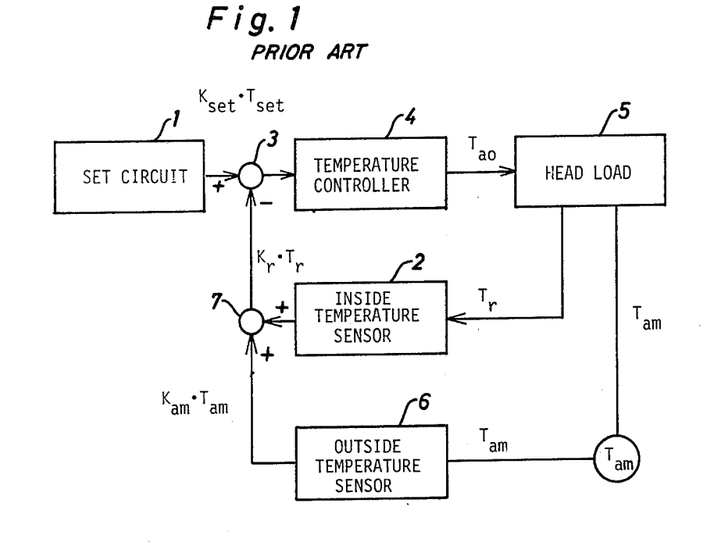
FIG. 1 illustrates a conventional control system for an air conditioner.

As shown in FIG. 1, a conventional control system for an air conditioner comprises a set circuit 1 for producing an output signal indicative of a desired temperature $T_{set}$ of air in a compartment to be conditioned, a temperature sensor 2 for producing an output signal indicative of the actual temperature $T_r$ of air in the compartment, and a detector 3 responsive to the output signals from set circuit 1 and sensor 2 for detecting any deviation between the desired temperature $T_{set}$ and the actual temperature $T_r$ and for producing an output signal indicative of the detected deviation. A temperature controller 4 receives the output signal from detector 3 to control the temperature of air flow in accordance with the deviation so as to adjust the actual temperature $T_r$ to the desired temperature $T_{set}$ and maintain it at the same.

During operation of temperature controller 4, the sensor 2 acts to produce a feedback signal indicative of any change of the actual temperature in the compartment, and the controller 4 acts to adjust the actual temperature $T_r$ to the desired temperature $T_{set}$ in response to the feedback signal from sensor 2. In this instance, the heat load in the compartment fluctuates in accordance with variations of the outside ambient temperature $T_{am}$, and subsequently the actual temperature $T_r$ fluctuates due to delay of heat transfer in the compartment. To restrain fluctuation in the actual temperature in the compartment, an outside ambient temperature sensor 6 and an adder 7 are provided to preliminarily compensate the fluctuation of heat load caused by a change of the outside ambient temperature $T_{am}$. Furthermore, the sensor 2 is arranged to compensate the fluctuation of heat load caused by sunshine entering the compartment.

In the control system described above, assuming that the quantity of air flow is at a constant value, the temperature of air flow is adjusted by controller 4 as represented by the following equation.

$$T_{ao} = K_{set} \cdot T_{set} - K_{am} \cdot T_{am} - K_r T_r + C$$

where $T_{set}$ is the desired temperature in the compartment, $T_{am}$ is the outside ambient temperature, $T_r$ is the actual temperature in the compartment, C is a constant, and $K_{set}$, $K_{am}$ and $K_r$ are respective gains of set circuit 1, and sensors 6 and 2. This means that the quantity of air flow is considered as a constant factor, and that only the temperature of air flow is adjusted by temperature controller 4 to adjust the actual temperature $T_r$ toward the desired temperature $T_{set}$.

In another conventional control system for the air conditioner, the quantity of air flow is controlled either in accordance with variation of the temperature of air flow or the deviation between the actual temperature and the desired temperature. In this instance, however, the temperature of air flow is calculated on the basis of the quantity of air flow normally required in use.

In controlling the air conditioner, it is desirable that the quantity and temperature of air flow are controlled in accordance with such changes of surroundings as intensity of sunshine, change of the seasons, and the like. It is also desirable that in summer, the quantity of air flow is increased to enhance the feeling of draft in the compartment and is decreased in winter to enhance the feeling of warmth due to the high temperature of air flow, and that the quantity of air flow is increased in accordance with the intensity of sunshine to enhance the feeling of draft without any fluctuation of the actual temperature in the compartment. However, these requirements may not be fulfilled in the conventional control systems described above.

SUMMARY OF THE INVENTION

It is, therefore, a primary object of the present invention to provide a control method and apparatus for an air conditioner capable of realizing the above noted requirements.

In the preferred embodiment of the present invention the primary object is accomplished by providing a method for controlling an air conditioner including first control means for controlling the quantity of air flow discharged from the air conditioner into a compartment and second control means for controlling the temperature of air flow, the method comprising the steps of:

detecting the quantity of heat necessary for adjusting the actual temperature of air in the compartment to a desired value and maintaining it at the same.

determining the quantity of air flow in accordance with the actual ambient temperature outside the compartment;

determining the temperature of air flow in relation to the determined quantity of air flow necessary for discharging the detected quantity of heat into the compartment; and controlling each setting of the first and second control means in response to the determination of the quantity and temperature of air flow.

In the above control method, it is preferable that the steps of determining the quantity and temperature of air flow are executed taking into consideration the intensity of sunshine in the compartment and the maximum cooling and heating ability of the air conditioner.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 2:
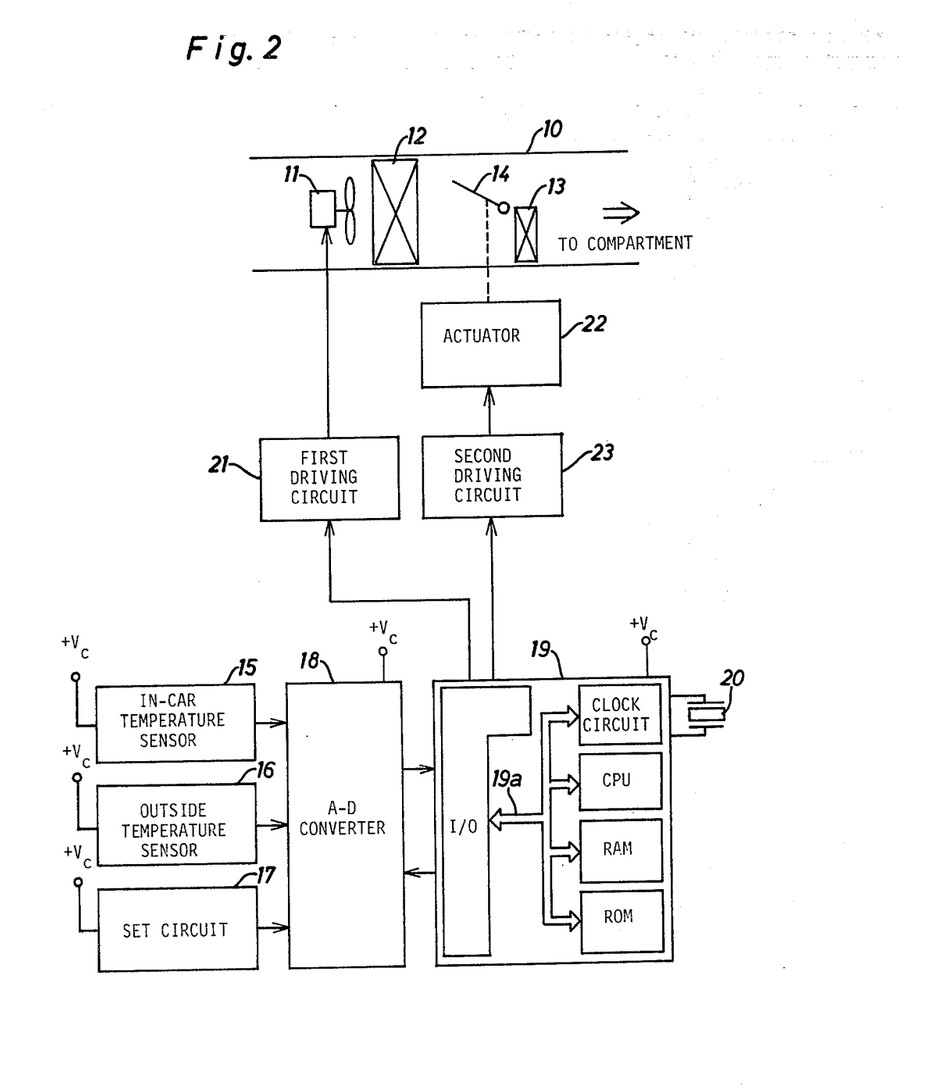
FIG. 2 is a schematic block diagram of an electric control apparatus in accordance with the present invention adapted to an automobile air conditioner.

Referring now to FIG. 2 of the drawings, there is schematically illustrated a preferred embodiment of the present invention in which a microcomputer 19 is utilized to execute a predetermined computer program for air conditioning in the passenger compartment of a vehicle. The reference numeral 10 indicates an air duct of a conventional automobile air conditioner which is provided therein with a blower 11, a cooler-core 12 and a heater-core 13. An air-blend door 14 is arranged in a conventional manner to adjust the proportion of the cooled air from cooler-core 12 and the warmed air from heater-core 13 flowing into the passenger compartment, as shown by an arrow in the figure. The microcomputer 19 is connected through an analog-to-digital or A-D converter 18 to an in-car temperature sensor 15, an outside ambient temperature sensor 16 and a set circuit 17.

The in-car temperature sensor 15 includes a thermally sensitive resistance element which is located in the passenger compartment to detect actual in-car temperature in the compartment and to produce an electric signal indicative of the actual in-car temperature. The outside ambient temperature sensor 16 includes a thermally sensitive resistance element which is located outside the passenger compartment to detect actual outside ambient temperature and to produce an electric signal indicative of the actual outside temperature. The set circuit 17 includes a variable resistor which is manually adjusted to produce an electric signal indicative of a desired in-car temperature. A-D converter 18 acts to convert the electric signals from sensors 15, 16 and set circuit 17 into electric binary code signals respectively.

The microcomputer 19 is in the form of a single chip LSI microcomputer which receives a constant voltage of $+V_c$ from a voltage stabilizer (not shown) in its operation. The voltage stabilizer is supplied with electric power from a vehicle battery (not shown) upon closing an ignition switch (not shown) to produce the constant voltage therefrom. The microcomputer 19 comprises a central processing unit or CPU which is connected to an input-output device or I/O through a bus line 19a. CPU is also connected through bus line 19a to a clock circuit, a read only memory or ROM and a random access memory or RAM. I/O receives the electric binary code signals from A-D converter 18 to store them in RAM temporarily. These stored signals are selectively read out from RAM and applied to CPU through bus line 19a. CPU serves to execute the predetermined computer program in accordance with clock signals from the clock circuit. The clock circuit is cooperable with a crystal oscillator 20 to produce the clock signals at a predetermined frequency. The predetermined computer program is stored in ROM such that the computer 19 calculates the quantity of heat necessary for controlling the in-car temperature at a desired level and calculates the quantity of air flow and the temperature of air flow necessary for discharging the calculated quantity of heat into the passenger compartment, as described in detail later.

A first driving circuit 21 has an input terminal connected to a first output terminal of computer 19 and an output terminal connected to an input terminal of blower 11. The first driving circuit 21 acts to control electric power supply to blower 11 in response to an output signal indicative of the calculated quantity of air flow from computer 19. Thus, the blower 11 is driven to generate the same quantity of air flow as the calculated one. An electrically operated actuator 22 is in the form of an electric motor or an electromagnetically operated servomotor which is linked with air-blend door 14 to control the angular position of blend door 14 in response to an output signal from a second driving circuit 23. The second driving circuit 23 has an input terminal connected to a second output terminal of computer 19 and an output terminal connected to an input terminal of actuator 22. The second driving circuit 23 acts to control electric power supply to actuator 23 in response to an output signal indicative of the calculated temperature of air flow from computer 19. Thus, the angular position of air-blend door 14 is adjusted by operation of the actuator 22 to maintain temperature of air flow discharged from the air conditioner in the calculated resultant value. In addition, the above control system may include a position sensor (not shown) which is provided to detect the angular position of air-blend door 14 for detecting the actual temperature of air flow from the air conditioner.

Figure 3:
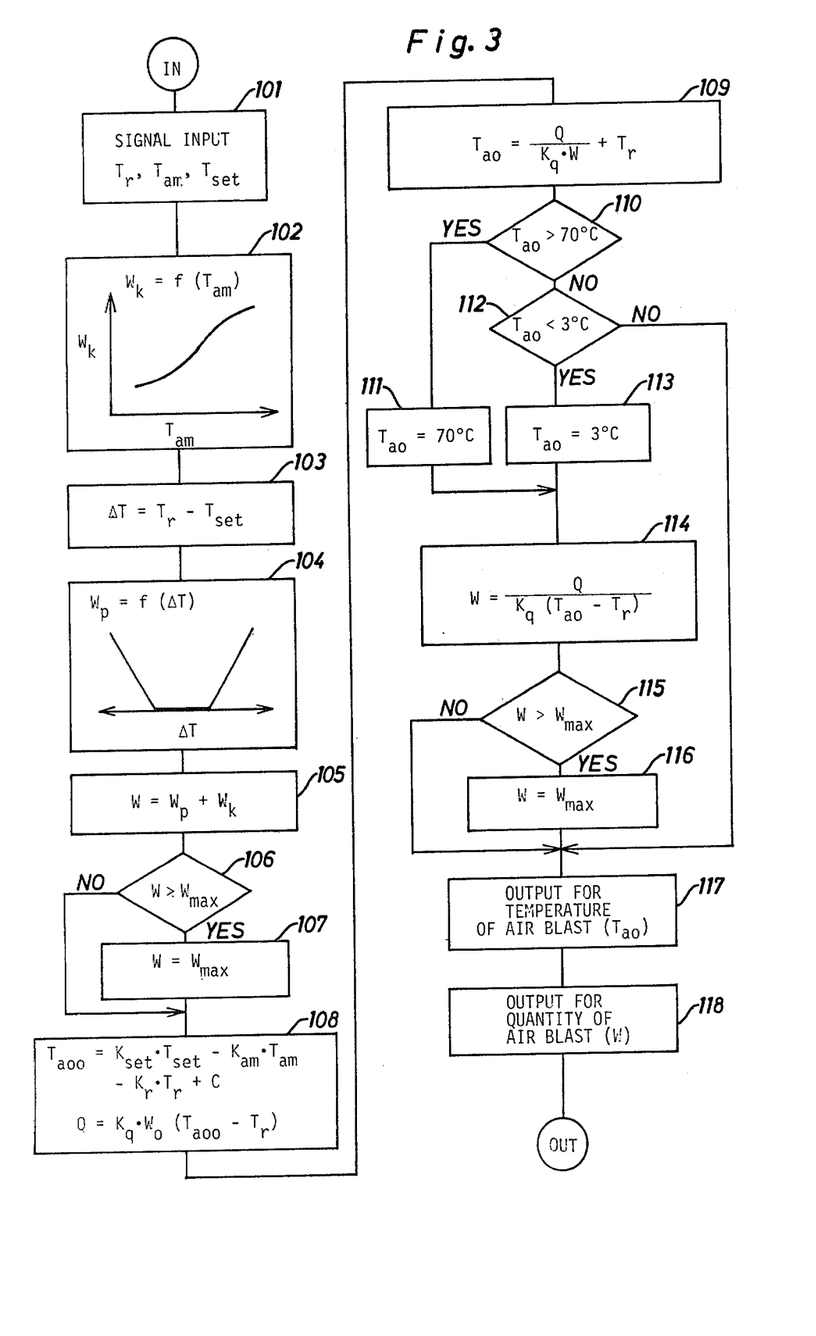
FIG. 3 is a flow diagram illustrating operation of the digital computer shown in block form in FIG. 2.

Hereinafter, operational modes of the above control system will be described in detail with reference to a flow chart shown in FIG. 3. When the voltage stabilizer is energized by closing the ignition switch to produce a constant voltage therefrom, the microcomputer 19 is conditioned in its operation to initiate execution of the following calculations according to the predetermined computer program at a frequency of approximately several ten milliseconds. Simultaneously, electric signals from sensors 15, 16 and set circuit 17 are converted by A-D converter 18 into binary code signals respectively indicative of actual in-car temperature $T_r$, outside ambient temperature $T_{am}$ and a desired in-car temperature $T_{set}$. When the computer program proceeds to a point 101, the actual in-car temperature $T_r$, outside ambient temperature $T_{am}$ and the desired in-car temperature $T_{set}$ are memorized in RAM of computer 19. At a point 102, CPU of computer 19 calculates an appropriate quantity of air flow $W_k$ in accordance with changes of the outside ambient temperature based on the following equation.

$$W_k = f(T_{am})$$

where $W_k$ is a quantity of air flow (sometimes referred to as air blast) to be discharged from the air conditioner, f is a constant, and $T_{am}$ is the outside ambient temperature. This means that a small quantity of air blast is calculated by CPU of computer 19 when the temperature of air blast is high under low outside ambient temperature in winter and that a large quantity of air blast is calculated by CPU of computer 19 to enhance draft feeling when the temperature of air blast is low under high outside ambient temperature in summer. For this purpose, each quantity of air blast $W_k$ relative to each outside ambient temperature $T_{am}$ may be stored in ROM in the form of a map or table to read out an appropriate quantity of air blast $W_k$ in accordance with changes of outside ambient temperature $T_{am}$.

When the computer program proceeds to a point 103, CPU of computer 19 calculates a deviation $\Delta T$ between the actual in-car temperature $T_r$ and the desired in-car temperature $T_{set}$ based on an equation of $\Delta T = T_r - T_{set}$. At the following point 104, CPU of computer 19 calculates a quantity of air blast $W_p$ to be increased in accordance with the calculated deviation $\Delta T$ based on an equation of $W_p = f(\Delta T)$. This means that the quantity of air blast $W_p$ is calculated as null when the deviation $\Delta T$ is small and that the quantity of air blast $W_p$ is calculated as an increased value in accordance with increase of the deviation $\Delta T$. At the successive point 105, CPU of computer 19 acts to add the calculated quantity of air blast $W_p$ to the previously calculated quantity of air blast $W_k$ so as to determine a quantity of air blast W which is discharged into the passenger compartment from the air conditioner.

When the program proceeds to a point 106, CPU of computer 19 discriminates as to whether or not the quantity of air blast W is larger than a maximum quantity of air blast $W_{max}$ of blower 11. If an answer is "yes", CPU of computer 19 proceeds the program to a point 107 where the calculated quantity of air blast W is compensated as the maximum quantity of air blast $W_{max}$. If an answer is "no", CPU of computer 19 proceeds the program to a point 108 where a quantity of heat Q is calculated by CPU of computer 19 to be discharged into the passenger compartment, which corresponds with heat load in the passenger compartment. For instance, assuming that the quantity of air blast W is a quantity of air blast $W_O$ of 200 m³/h, a temperature of air blast $T_{aoo}$ is calculated from the following equation.

$$T_{aoo} = K_{set} \cdot T_{set} - K_{am} \cdot T_{am} - K_r T_r + C \quad (1)$$

where $T_{set}$ is the desired in-car temperature, $T_{am}$ is the outside ambient temperature, $T_r$ is the actual in-car temperature, C is a constant, and $K_{set}$, $K_{am}$ and $K_r$ are respective gains of set circuit 17 and sensors 16, 15. Based on the above calculation, the quantity of heat Q is calculated by CPU of computer 19 from the following equation.

$$Q = K_q \cdot W_O (T_{aoo} - T_r) \quad (2)$$

where $K_q$ is a constant determined by the physical property of air.

Successively, the program proceeds to a point 109 where CPU of computer 19 calculates a temperature of air blast $T_{ao}$ necessary for discharging the calculated quantity of heat Q with the previously calculated quantity of air blast W. The calculation of temperature $T_{ao}$ is executed by CPU of computer 19 based on the following equation.

$$T_{ao} = Q/K_q \cdot W + T_r$$

At the following point 110, CPU of computer 19 discriminates as to whether or not the calculated temperature $T_{ao}$ is higher than the highest temperature 70° C. obtained by heater-core 13. If an answer is "yes", CPU of computer 19 proceeds the program to a point 111 where the calculated temperature $T_{ao}$ is compensated as the highest temperature 70° C., the program successively proceeding to a point 114. If an answer is "no", CPU of computer 19 proceeds the program to a point 112 where the calculated temperature $T_{ao}$ is compared with the lowest temperature 3° C. obtained by cooler-core 12. If the calculated temperature $T_{ao}$ is lower than the lowest temperature 3° C., CPU of computer 19 proceeds the program to a point 113 where the calculated temperature $T_{ao}$ is compensated as the lowest temperature 3° C., the program successively proceeding to the point 114. If the calculated temperature $T_{ao}$ is higher than the lowest temperature 3° C., CPU of computer 19 proceeds the program to a point 117 where an output signal indicative of the calculated temperature $T_{ao}$ is applied to the second driving circuit 23.

When the program proceeds to point 114, CPU of computer 19 calculates the following linear equation to compensate the previously calculated quantity of air blast W in accordance with the compensated value of calculated temperature $T_{ao}$.

$$W = Q/K_q (T_{ao} - T_r) \quad (3)$$

This serves to reliably supply the calculated quantity of heat Q at the compensated temperature $T_{ao}$. Successively, the program proceeds to a point 115 where CPU of computer 19 discriminates as to whether or not the compensated quantity of air blast W is larger than the maximum quantity of air blast $W_{max}$ of blower 11. If an answer is "yes", CPU of computer 19 proceeds the program to a point 116 where the compensated quantity of air blast W is further compensated as the maximum quantity of air blast $W_{max}$, and subsequently the program proceeds to a point 118 where an output signal indicative of the maximum quantity of air blast $W_{max}$ is applied to the first driving circuit 21. If an answer is "no", CPU of computer 19 proceeds the program to the point 118 where an output signal indicative of the compensated quantity of air blast W is applied to the first driving circuit 21. Thereafter, the computer program is returned to point 101 to repetitively conduct the calculations mentioned above.

Figure 4:
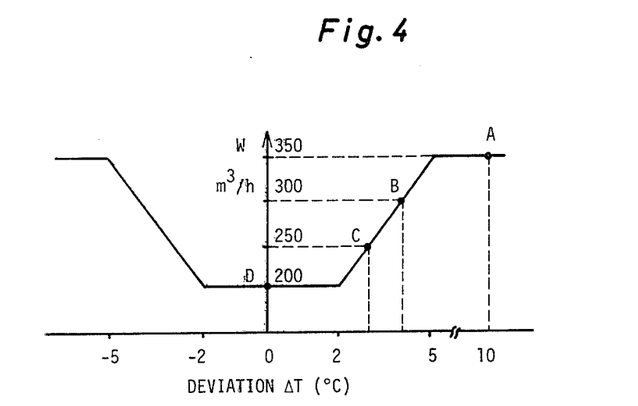
FIG. 4 is a graph illustrating a relationship between the deviation and the quantity of air flow which are calculated at points 103 and 104 in the flow diagram of FIG. 3.

In FIG. 4, there is illustrated a relationship between the deviation $\Delta T$ and the quantity of air blast $W_p$ which are calculated at points 103 and 104 during execution of the computer program in summer under the following initial condition.

Figure 5:
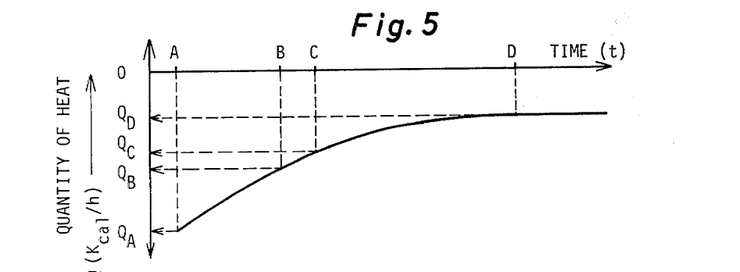
FIG. 5 is a graph illustrating a change of the quantity of heat in relation to lapse of time.
Figure 6:
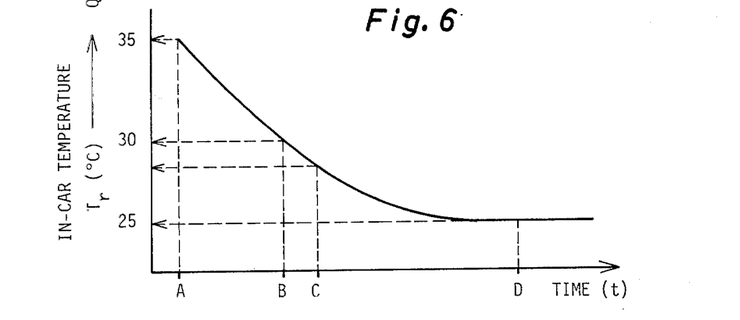
FIG. 6 is a graph illustrating a variation of actual in-car temperature in relation to lapse of time.

Desired in-car temperature $T_{set}$: 25° C.
Actual in-car temperature $T_r$: 35° C.
Outside ambient temperature $T_{am}$: 30° C.
Maximum quantity of air blast $W_{max}$: 350 m³/h FIG. 5 illustrates a change of the quantity of heat Q in relation to lapse of time t which is calculated as a negative value during execution of the computer program in summer. In FIG. 6, there is illustrated a variation of actual in-car temperature $T_r$ in relation to lapse of time t during operation of the above control system.

Assuming that CPU of computer 19 initiates execution of the computer program at time A, a deviation $\Delta T$ is calculated as $35 - 25 = 10°$ C. at point 103, a quantity of air blast W is calculated as 350 m³/h at point 105 and a quantity of heat $Q_A$ is calculated at point 108. In the following table, there are illustrated many combinations of a quantity of air blast (m³/h) and a temperature of air blast (°C.) for obtaining the calculated quantity of heat $Q_A$.

| Time | A | B | C | D |
|---|---|---|---|---|
| Quantity of heat | $Q_A$ | $Q_B$ | $Q_C$ | $Q_D$ |
| Wind/Temp. | 450/6.6 | 350/5.0 | 300/8.0 | 250/9.0 |
|  | 400/3.0 | 310/3.0 | 250/4.0 | 200/5.0 |

-continued

| | | | |
|---|---|---|---|
| 350/−1.6 | 300/2.1 | 200/−2.0 | 150/−1.7 |
| 300/−7.7 | 250/−3.2 | 150/−12 | 100/−15 |

As is understood from the above combinations, a temperature of air blast $T_{ao}$ is calculated as $-1.6°$ C. at point 109 of the computer program. This means that the calculated temperature $T_{ao}$ exceeds the maximum cooling ability of cooler-core 12. As a result, the calculated temperature $T_{ao}$ is compensated as 3° C. at point 113, and successively the calculated quantity of air blast W is maintained in 350 m³/h at points 114, 115 and 116 of the computer program. Thus, the computer 19 produces an output signal indicative of the compensated temperature of 3° C. at point 117, which is applied to the second driving circuit 23, and produces an output signal indicative of the calculated quantity of air blast W of 350 m³/h which is applied to the first driving circuit 21. This acts to supply the calculated quantity of heat $Q_A$ into the passenger compartment from the air conditioner so as to lower the actual in-car temperature $T_r$.

When the actual in-car temperature $T_r$ lowers to 29° C. at time B under control of the air conditioner as shown in FIG. 6, the deviation $\Delta T$ is calculated as $29-25=4°$ C. at point 103, the quantity of air blast W is calculated as 300 m³/h at point 105, and a quantity of heat $Q_B$ is calculated at point 108 of the computer program. Then, the temperature of air blast $T_{ao}$ is calculated as 2.1 at point 109 of the program. (see the above combination table) This means that the calculated temperature $T_{ao}$ still exceeds the maximum cooling ability of cooler-core 12. As a result, the calculated temperature $T_{ao}$ is compensated as 3° C. at point 113, and successively the calculated quantity of air blast W is also compensated as 310 m³/h at point 114 of the program. Thus, the computer 19 produces an output signal indicative of the compensated temperature 3° C. at point 117 and an output signal indicative of the compensated quantity of wind 310 m³/h at point 118.

When the actual in-car temperature $T_r$ lowers to 28° C. at time C as shown in FIG. 6, the deviation $\Delta T$ is calculated as $28-25=3°$ C. at point 103, the quantity of air blast W is calculated as 250 m³/h at point 105, and a quantity of heat $Q_C$ is calculated at point 108. (see FIGS. 4 and 5) Then, the temperature of air blast $T_{ao}$ is calculated as 4.0° C. at point 109 of the program. (see the above combination table) This means that the calculated temperature $T_{ao}$ does not exceed the maximum cooling ability of cooler-core 12 to proceed the program to points 117 and 118 from point 112. Thus, the computer 19 produces an output signal indicative of the calculated temperature 4° C. at point 117 and an output signal indicative of the calculated quantity of air blast 250 m³/h. Under control of the air conditioner responsive to the output signals from computer 19, the actual in-car temperature $T_r$ will be maintained in the desired in-car temperature 25° C. before longer. Successively, the quantity of air blast W is calculated as 200 m³/h and the temperature of air blast $T_{ao}$ is calculated as 5° C. so that the actual in-car temperature $T_r$ is maintained in the desired in-car temperature 25° C.

From the above description, it will be noted that maximum ability of blower 11 and cooler-core 12 is used as an upper cooling limit in summer to supply the calculated quantity of heat Q necessary for controlling the air condition in the passenger compartment. When the quantity of heat Q is calculated in a limited range defined by the maximum ability of blower 11 and cooler-core 12, a quantity of air blast W is preferentially determined to enhance draft feeling in a stable air conditioning. In winter, maximum ability of blower 11 and heater-core 13 is used as an upper limit to supply the calculated quantity of heat Q necessary for controlling the air condition in the passenger compartment. When the quantity of heat Q is calculated in a limited range defined by the maximum ability of blower 11 and heater-core 13, the quantity of air blast W is temperately determined to enhance the feeling of warmth in a stable air conditioning.

In the actual practices of the present invention, the above control method for the air conditioner may be modified as follows.

(1) To adapt the following steps to the above control method:
  detecting the actual quantity of heat discharged from the air conditioner, and
  controlling the actual quantity of air blast W and the actual temperature of air blast $T_{ao}$ in such a manner that the detected quantity of heat coincides with a quantity of heat Q calculated by the computer.

(2) To determine a combination of the quantity of air blast and the temperature of air blast taking into consideration intensity of sunshine, the number of passengers, the actual speed of the vehicle and the like.

(3) To compensate the data representing the maximum quantity of air blast $W_{max}$ at points 106, 107, 115 and 116 of the computer program when the outside air is entered into air duct 10 during high speed travel of the vehicle.

(4) To compensate respective values at points 110 to 113 of the computer program in accordance with respective actual temperatures of air blast immediately after passing through cooler-core 12 and heater-core 13 when the temperature of air blast may not be lowered below 3° C. in spite of full operation of the cooling device in midsummer or when the temperature of air blast may not be risen above 70° C. immediately after start of the prime engine in winter.

(5) To compensate each value at points 112 and 113 of the computer program in the case that the cooling temperature is maintained over 10° C. to ensure economical operation of the air conditioner.

(6) To eliminate setting of each maximum ability of blower 11, cooler-core 12 and heater-core 13 in the case that sufficient cooling and heating ability is always obtainable in the air conditioner.

(7) To compensate the constant C at point 108 of the computer program in accordance with humidity, intensity of sunshine, the number of passengers, the actual speed of the vehicle, the rate of ventilation in the passenger compartment, and the like.

Figure 7:
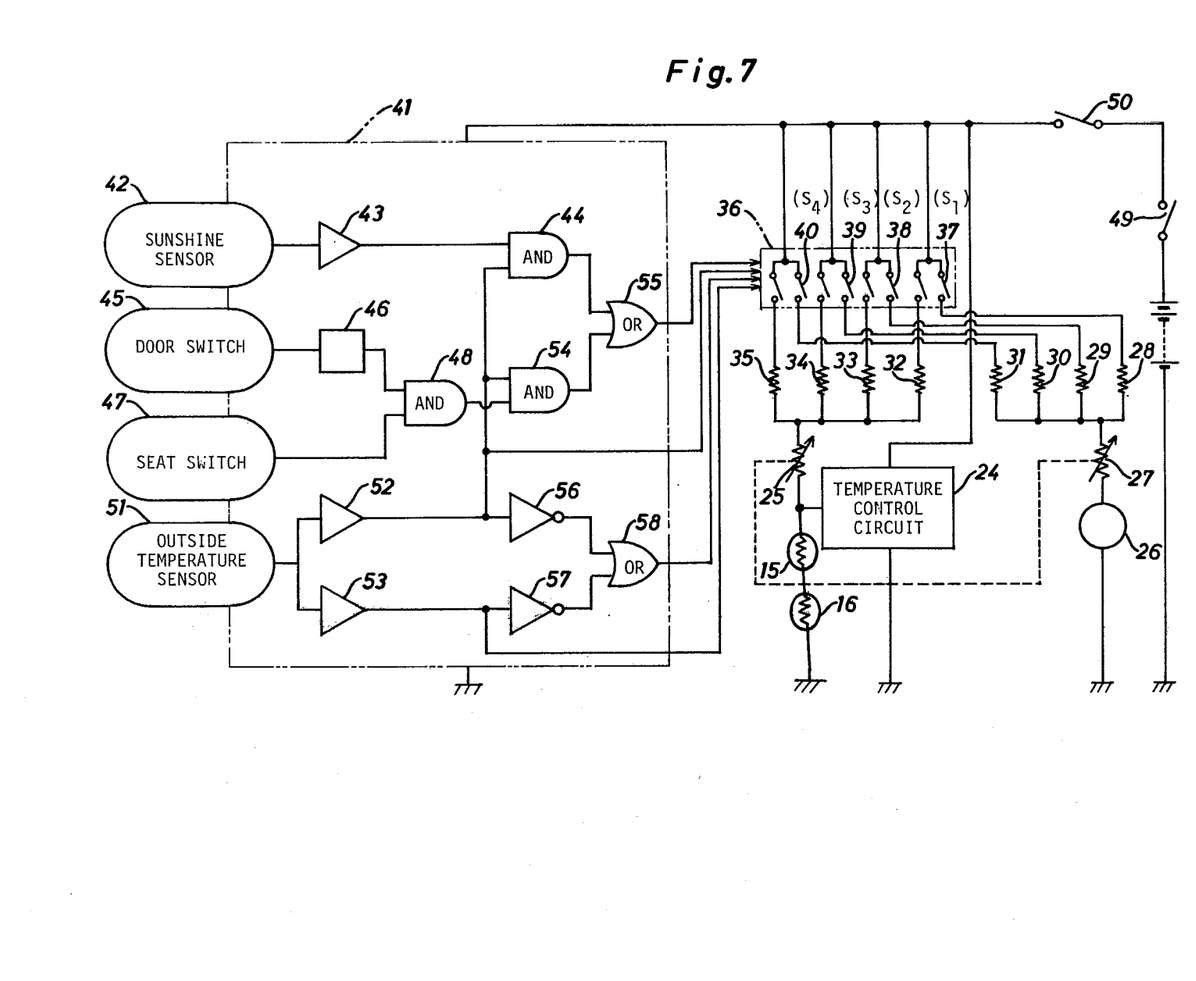
FIG. 7 illustrates another electric control apparatus in accordance with the present invention.

Although the above control of the automobile air conditioner is accomplished by execution of the computer program in use of the microcomputer 19, an electric control apparatus in the form of hardware may be adapted to control the air conditioner in a method substantially equivalent to the control method described above. In FIG. 7, there is illustrated a preferred embodiment of the electric control apparatus in which a conventional temperature control circuit 24 is connected to a group of temperature control resistors 32 to 35 through a variable resistor 25 and is connected in series with an in-car temperature sensor 15 and an outside ambient temperature sensor 16. The temperature control circuit 24 acts to produce an output signal for controlling the angular position of the air-blend door in accordance with a combined resistance value of the input resistors indicative of various control parameter. Each of temperature control resistors 32 to 35 is connected to an electric power source in the form of a vehicle battery by way of a switching circuit 36, an input switch 50 and an ignition switch 49. A blower motor 26 corresponds with the first driving circuit 21 for blower 11 of FIG. 2 and is connected to a group of air blast control resistors 28 to 31 through a variable resistor 27.

Figure 8:
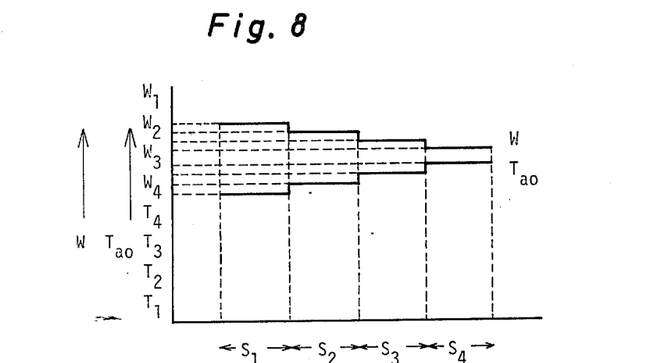
FIG. 8 is a graph illustrating a control pattern of air flow under control of the electric control apparatus of FIG. 7.

In the above arrangement, the variable resistor 25 serves to determine a desired in-car temperature, and the variable resistor 27 is interconnected with the variable resistor 25 to compensate the quantity of air blast relative to the desired in-car temperature. The switching circuit 36 includes a group of switches 37 to 40 which are selectively closed to provide a connection between the group of resistors 32 to 35 and the group of resistors 28 to 31. Each resistance value of resistors 28 to 35 is determined to provide four sorts of combination of the quantity of air blast W and the temperature of air blast $T_{ao}$ necessary for maintaining the quantity of heat Q in a constant value, as shown in FIG. 8. When the switch 37 or ($S_1$) is closed to provide a connection between resistors 28 and 32, a largest quantity of air blast $W_1$ is supplied by blower 11 under the control of blower motor 26 and a lowest temperature of air blast $T_1$ is determined by the angular position of air-blend door under the control of temperature control circuit 24. When the switch 38 or ($S_2$) is closed to provide a connection between resistors 29 and 33, a slightly smaller quantity of air blast $W_2$ is supplied and the temperature of air blast is adjusted in a slightly higher value $T_2$. When the switches 39 and 40 are successively closed, the quantity of air blast W is successively decreased and the temperature of air blast $T_{ao}$ is also successively risen. In this instance, if the desired in-car temperature $T_{set}$ is changed by adjustment of variable resistor 25, the variable resistor 27 will vary each weight of resistors 28 to 31 in accordance with the change of weight of resistors 32 to 35. This serves to compensate the quantity of heat Q in accordance with changes of the desired in-car temperature.

A feeling adjustment circuit 41 is provided to conduct the selective connection in switching circuit 36 in accordance with such a change of air conditioning state as change of the seasons, intensity of sunshine, opening or closure of the vehicle door and the like. The feeling adjustment circuit 41 includes a sunshine sensor 42 for producing an output voltage indicative of intensity of sunshine and a comparator 43 for comparing the output voltage of sensor 42 with a standard voltage. When the output voltage of sensor 42 is higher than the standard voltage, the comparator 43 produces a high level signal therefrom which is applied to an AND gate 44. The feeling adjustment circuit 41 further includes a door switch 45 for producing an output signal in response to closure of the operator's side door of the vehicle and a seat switch 47 for producing an output signal in response to seating of the operator. A timer circuit 46 receives the output signal from door switch 45 to produce an output signal therefrom during a predetermined period of time, and an AND gate 48 receives the output signals from timer circuit 46 and seat switch 47 to produce a high level signal therefrom. When the operator closes the side door after seating on his seat and closes the switches 49 and 50, the high level signal from AND gate 48 is maintained for the predetermined period of time immediately after the operator is on board.

An outside ambient temperature sensor 51 is provided to detect instant ambient temperature outside the passenger compartment for producing an output voltage indicative of the instant outside temperature. (This sensor 51 may be adapted to the temperature control circuit as one of input resistors.) A pair of comparators 52 and 53 are connected to sensor 51 to compare the output voltage of sensor 51 with high and low standard voltages. When the output voltage of sensor 51 is higher than a high standard voltage indicative of 28° C. in summer, the comparator 52 produces a high level signal therefrom which is applied to an inverter 56. When the output voltage of sensor 51 is lower than a low standard voltage indicative of 14° C. in winter, the comparator 53 produces a high level signal therefrom which is applied to an inverter 57. While the outside ambient temperature is in a range between 14° C. and 28° C., each of comparators 52, 53 produces a low level signal therefrom. When the intensity of sunshine is larger than the standard level at an outside ambient temperature higher than 28° C. in summer, AND gate 44 produces a high level signal therefrom by receiving the high level signals from comparators 43 and 52. Immediately after the operator is on board at an outside ambient temperature higher than 28° C. in summer, an AND gate 54 produces a high level signal therefrom by receiving the high level signals from AND gate 48 and comparator 52.

Upon receiving one of the high level signals from AND gates 44, 54, an OR gate 55 produces a high level signal which is applied to switching circuit 36 to close the switch 37 or ($S_1$). This results in the first control pattern of air blast defined by a range $S_1$ shown in FIG. 8. When the high level signal from comparator 52 is applied to switching circuit 36, the switch 38 or ($S_2$) is closed to provide the second control pattern of air blast defined by a range $S_2$ of FIG. 8. When the low level signals from comparators 52 and 53 are inverted by the pair of inverters 56, 57 into high level signals in spring or autumn, an OR gate 58 produces a high level signal therefrom by receiving the high level signals from inverters 56, 57 to close the switch 39 of switching circuit 36 so as to conduct the third control pattern of air blast defined by a range $S_3$ of FIG. 8. In winter, the comparator 53 will produce a high level signal therefrom which is applied to switching circuit 36 to close the switch 40. This results in the fourth control pattern of air blast defined by a range $S_4$ of FIG. 8.

Further, in a preferred embodiment of the present invention, the above control systems may be adapted to an automobile air conditioner of the type which comprises an evaporator connected with a refrigerant compressor and arranged within an air duct for cooling the air flowing therethrough, a heater arranged within the air duct to receive heat energy of water in the engine coolant system for warming the cooled air from the evaporator, and an electrically operated control valve arranged to adjust the heat energy of water applied to a heater for controlling the temperature of air flowing into the passenger compartment.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A method for controlling an air conditioner including first control means for controlling the quantity of air flow discharged from the air conditioner into a compartment and second control means for controlling the temperature of air flow, said method comprising the steps of:
   determining the quantity of heat necessary for adjusting the actual temperature of air in said compartment to a desired value and maintaining it at the same;
   determining the quantity of air flow in accordance with the actual ambient temperature outside said compartment;
   determining the temperature of air flow in relation to the determined quantity of air flow necessary for discharging the determined quantity of heat into said compartment; and
   controlling each setting of said first and second control means in response to the determination of the quantity and temperature of air flow.

2. A method for controlling an air conditioner as claimed in claim 1, wherein the steps of determining the quantity and temperature of air flow are executed taking into consideration the intensity of sunshine entering said compartment.

3. A method for controlling an air conditioner as claimed in claim 1 or 2, wherein the step of determining the temperature of air flow is executed taking into consideration the maximum cooling and heating ability of the air conditioner.

4. A method for controlling an air conditioner as claimed in claim 3, wherein the step of determining the quantity of air flow is executed taking into consideration the maximum air flow capacity of the air conditioner.

5. An electric control method for an automobile air conditioner including an air duct for allowing the flow of air into the passenger compartment of the automobile, a blower arranged within said air duct for controlling the quantity of air flow discharged therefrom into said compartment, and a temperature control means arranged for controlling the temperature of air flow from said blower, said method comprising the steps of:
   producing a first electric binary signal indicative of the actual temperature of air in said compartment;
   producing a second electric binary signal indicative of the actual ambient temperature outside said compartment;
   producing a third electric binary signal indicative of a desired temperature of air in said compartment;
   calculating the quantity of air flow in accordance with a value of said second binary signal;
   calculating, in response to said first, second and third binary signals, the quantity of heat necessary for adjusting the actual temperature in said compartment to the desired temperature and maintaining it at the same;
   calculating the temperature of air flow in relation to the calculated quantity of air flow necessary for discharging the calculated quantity of heat into said compartment;
   controlling the setting of said blower in response to the calculated quantity of air flow; and
   controlling the setting of said temperature control means in response to the calculated temperature of air flow.

6. An electric control method for an automobile air conditioner as claimed in claim 5, wherein the step of calculating the quantity of air flow is executed taking into consideration the deviation between values of said first and third binary signals and the maximum air flow capacity of said blower and wherein the step of calculating the temperature of air flow is executed taking into consideration the maximum ability of said temperature control means.

7. An electric control method for an automobile air conditioner including an air duct for allowing the flow of air into the passenger compartment of the automobile, a blower arranged within said air duct for controlling the quantity of air flow discharged therefrom into said compartment, a cooler-core arranged within said air duct for cooling the air flowing therethrough, a heater-core arranged for warming a portion of the cooled air flowing from said cooler-core to said compartment therethrough, and an air-blend control device arranged between said cooler-core and said heater-core for selectively controlling the relative proportions of cooled air flowing to be warmed by said heater-core and of cooled air directly flowing into said compartment, said method comprising the steps of:
   producing a first electric binary signal indicative of the actual temperature of air in said compartment;
   producing a second electric binary signal indicative of the actual ambient temperature outside said compartment;
   producing a third electric binary signal indicative of a desired temperature of air in said compartment;
   calculating the quantity of air flow in accordance with a value of said second binary signal;
   calculating, in response to said first, second and third binary signals, the quantity of heat necessary for adjusting the actual temperature in said compartment to the desired temperature and maintaining it at the same;
   calculating the temperature of air flow in relation to the calculated quantity of air flow necessary for discharging the calculated quantity of heat into said compartment;
   controlling the setting of said blower in response to the calculated quantity of air flow; and
   controlling the setting of said air-blend control device in response to the calculated temperature of air flow.

8. An electric control method for an automobile air conditioner as claimed in claim 7, wherein the step of calculating the quantity of air flow is executed taking into consideration the deviation between said first and third binary signals and the maximum air flow capacity of said blower.

9. An electric control method for an automobile air conditioner as claimed in claim 7 or 8, wherein the step of calculating the temperature of air flow is executed taking into consideration the maximum cooling ability of said cooler-core and the maximum heating ability of said heater-core.

10. An electric control apparatus for an automobile air conditioner including an air duct for allowing the flow of air into the passenger compartment of the automobile, a blower arranged within said air duct for controlling the quantity of air flow discharged therefrom into said compartment, and a temperature control means arranged for selectively cooling and/or warming the air flowing from said blower into said compartment, the improvement comprising:

first means for producing a first electric binary signal indicative of the actual temperature of air in said compartment;

second means for producing a second electric binary signal indicative of the actual ambient temperature outside said compartment;

third means for producing a third electric binary signal indicative of a desired temperature of air in said compartment;

a digital computer programmed to calculate the quantity of air flow in accordance with a value of said secondary binary signal taking into consideration the deviation between values of said first and third binary signals, said computer being programmed to calculate the quantity of heat necessary for adjusting the actual temperature in said compartment to the desired temperature and maintaining it at the same and further programmed to calculate the temperature of air flow in relation to the calculated quantity of air flow necessary for discharging the calculated quantity of heat into said compartment, said computer producing a first control signal indicative of the calculated quantity of air flow and a second control signal indicative of the calculated temperature of air flow;

fourth means for controlling the setting of said blower in response to said first control signal from said computer; and fifth means for controlling the setting of said temperature control means in response to said second control signal from said computer.

11. An electric control apparatus for an automobile air conditioner including an air duct for allowing the flow of air into the passenger compartment of the automobile, a blower arranged within said air duct for controlling the quantity of air flow discharged therefrom into said compartment, a cooler-core arranged within said air duct for cooling the air flowing therethrough, a heater-core arranged for warming a portion of the cooled air flowing from said cooler-core to said compartment therethrough, and an air-blend control device arranged between said cooler-core and said heater-core for selectively controlling the relative proportions of cooled air flowing to be warmed by said heater-core and of cooled air directly flowing into said compartment;

the improvement comprising:

first means for producing a first electric binary signal indicative of the actual temperature of air in said compartment;

second means for producing a second electric binary signal indicative of the actual ambient temperature outside said compartment;

third means for producing a third electric binary signal indicative of a desired temperature of air in said compartment;

a digital computer programmed to calculate the quantity of air flow in accordance with a value of said second binary signal taking into consideration the deviation between values of said first and third binary signals, said computer being programmed to calculate the quantity of heat necessary for adjusting the actual temperature in said compartment to the desired temperature and maintaining it at the same and further programmed to calculate the temperature of air flow in relation to the calculated quantity of air flow necessary for discharging the calculated quantity of heat into said compartment, said computer producing a first control signal indicative of the calculated quantity of air flow and a second control signal indicative of the calculated temperature of air flow;

fourth means for controlling the setting of said blower in response to said first control signal from said computer; and fifth means for controlling the setting of said air-blend control device in response to said second control signal from said computer.

12. An electric control apparatus as claimed in claim 11, wherein said computer is further programmed to compensate the calculated quantity of air flow in relation to the maximum air flow capacity of said blower and to compensate the calculated temperature of air flow in relation to the maximum cooling ability of said cooler-core and the maximum heating ability of said heater-core.

* * * * *